April 5, 1955 J. F. BENGTSSON 2,705,628
PENDULUM WEIGHING SCALES
Filed April 18, 1950 3 Sheets-Sheet 1

INVENTOR.
J. Fredrik Bengtsson

April 5, 1955

J. F. BENGTSSON 2,705,628

PENDULUM WEIGHING SCALES

Filed April 18, 1950

3 Sheets-Sheet 2

INVENTOR.
J. Fredrik Bengtsson 2,705,628
Patented Apr. 5, 1955

United States Patent Office

2,705,628

PENDULUM WEIGHING SCALES

Johan Fredrik Bengtsson, New York, N. Y.

Application April 18, 1950, Serial No. 156,679

6 Claims. (Cl. 265—62)

This invention relates to pendulum weighing scales.

Pendulum weighing scales are usually provided with a cam element of complicated form for adjusting the movement of the indicator, and, in addition, other elements in need of critical adjustment are often employed. Also, the load-counterbalancing pendulum usually deflects only at one side of the vertical through the pendulum fulcrum.

The object of my invention is to ensure proportionality between the movements of the indicator and the loads which cause the movements, without the use of such cam element and without the use of any other element in need of a critical adjustment. In this way those errors are eliminated which are always associated with adjustable elements.

Another object is to provide means for enabling the pendulum to be active at both sides of the vertical through the pendulum fulcrum, whereby all the possible space, within which the pendulum may oscillate, is utilized.

Figure 1:
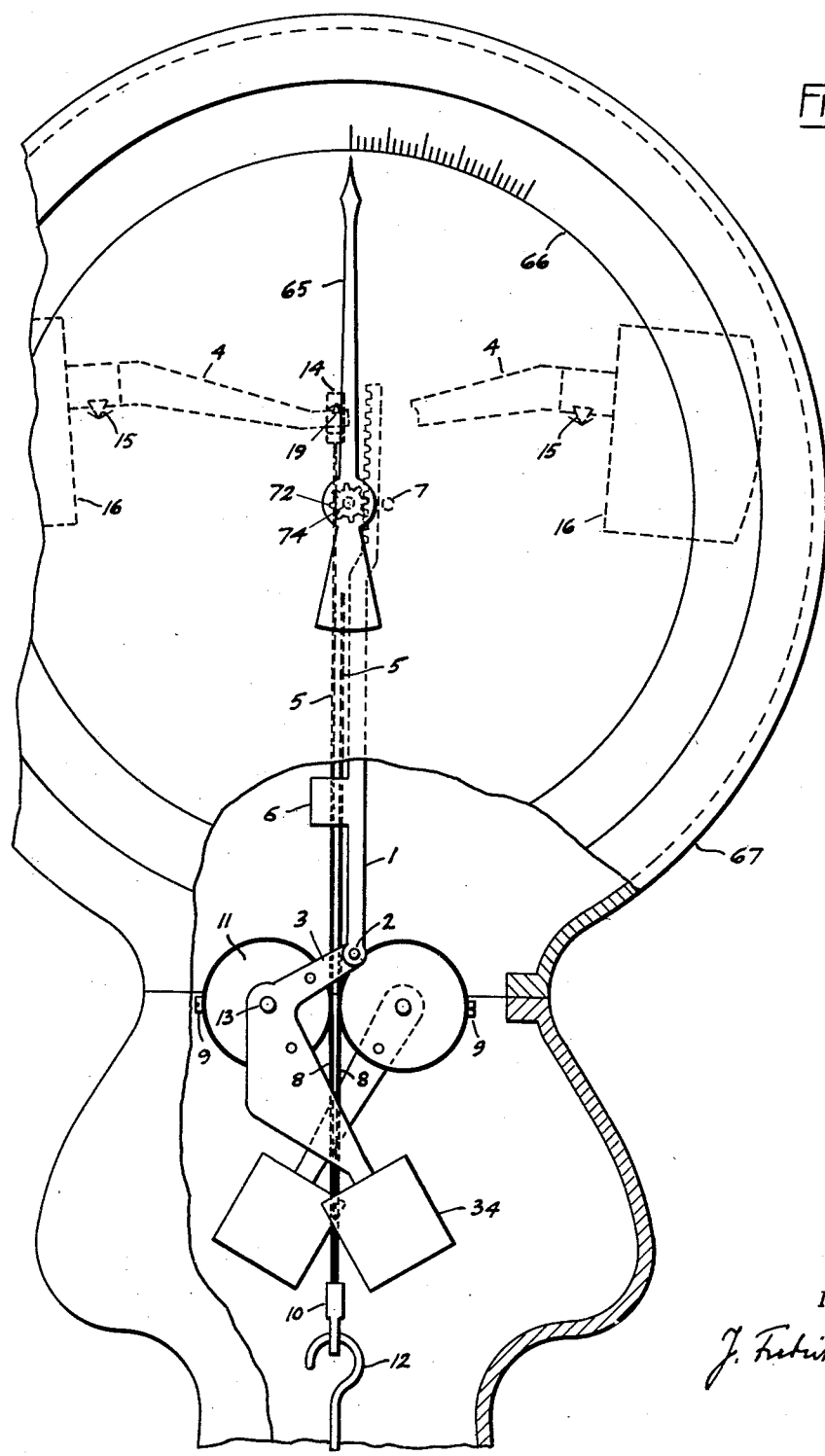
Figure 2:
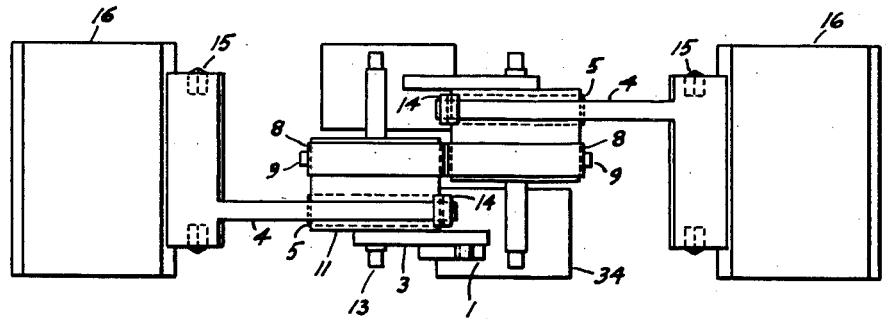
Figure 4:
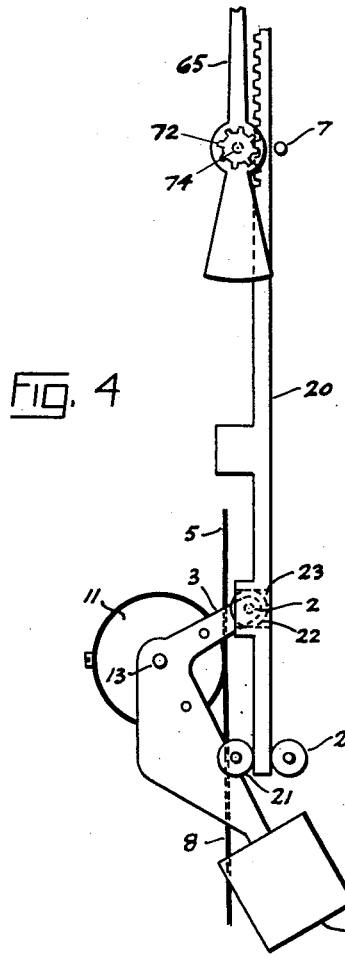
Figure 3:
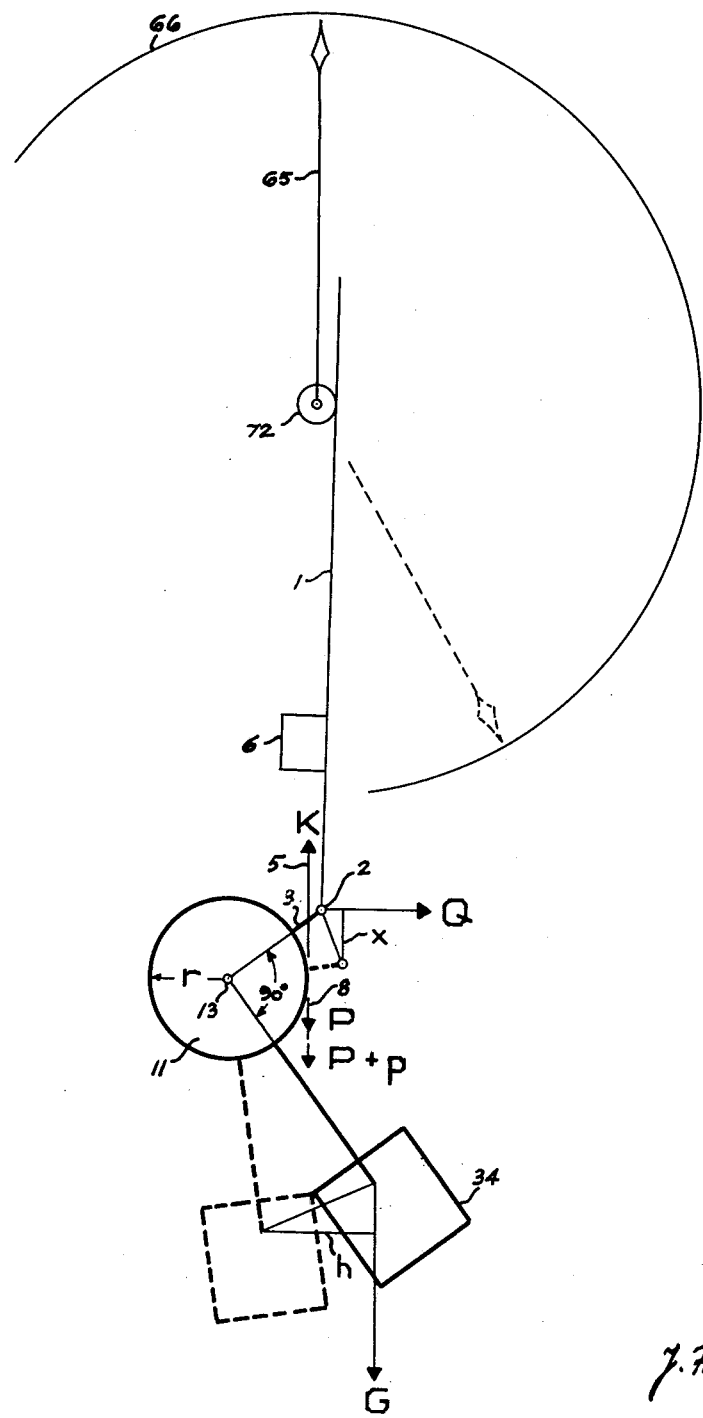

In the accompanying drawings Fig. 1 is a front view of the weighing mechanism; Fig. 2 is a plan view of the same; Fig. 3 is a diagrammatic illustration explaining the principle of the weighing mechanism; and Fig. 4 is a front view of an alternative rack arrangement.

Referring to Figs. 1 and 2, affixed upon a shaft 13, which is mounted in a housing 67 and rotates back and forth on a fixed axis, is a load-counterbalancing pendulum comprising a power cylinder 11 concentric with the shaft 13, an angled pendulum arm 3 fixed to the power cylinder, and a pendulum weight 34 fixed to the pendulum arm. The pendulum arm 3 is provided with a lateral pivot 2, by means of which the pendulum is pivotally connected with the lower end of a rack 1.

A second pendulum may, as shown in the drawings, be used to participate in counterbalancing the load. In contrast to the first pendulum, this second pendulum need not be provided with a pivot 2, inasmuch as only one rack 1 is necessary.

The rack 1 is, for all practical purposes, vertically disposed and is provided with an overhang weight 6, rigid with the rack. Said weight 6 hangs over on the left side of the vertical thru the pivot 2 and produces a counter-clockwise turning moment on the rack 1 about the pivot 2, sufficient to hold the upper end of the rack pressed against and in mesh with the pinion 72, which together with an indicator 65 is fixed upon a shaft 74 rotatably mounted in the housing 67, eliminating all backlash and holding the pinion and the indicator 65 in a fixed position, when the weighing mechanism is in equilibrium. A pin 7 prevents the rack from moving out of engagement with the pinion. The movement of the pendulum is transmitted to the indicator 65 by means of the rack and the pinion. The indicator 65 registers on the circular dial 66, which is fastened in the housing 67.

A flexible ribbon 8 is laid half around the peripheral face of the power cylinder 11, being attached thereto at one point by means of a screw 9, the ribbon end depending from the side of the power cylinder and connected to the scale platform (not shown) by a yoke 10 and a link 12.

A flexible ribbon 5 is laid half around the peripheral face of the power cylinder 11, beside the ribbon 8 and attached to the cylinder in like manner as the ribbon 8, but separately from this ribbon. The end of the ribbon 5 extends vertically upward from the side of the power cylinder and attached to it is a yoke 14. A weighted lever device comprising an arm 4 and a weight 16 is rotatably mounted in the housing 67 by means of a knife-edge 15. Another upturned knife-edge 19 is provided at the end of the arm 4 and received in a seat provided in the yoke 14.

The rack 1 does not move a distance equal to the overlap of the ribbon 8 on the cylinder 11. We are concerned with static balancing conditions and, as later will be shown, with the fact that the vertically measured movements of the rack are proportional to the loads which cause them. The actual movements of the rack and the ribbon depend on detail dimensions, which in the drawings are chosen so that the movement of the ribbon is smaller than that of the rack. The shaft 13 is rotatably mounted in the housing 67 and has no other movement than a rotating one. The pendulum therefore oscillates about a fixed axis.

A separate lever device for the second pendulum is shown but, for the sake of clarity, is not fully drawn, although only one weighted lever device could be used for both pendulums.

The weighted lever device exerts an upwardly-directed force on the pendulum and keeps the pendulum in a position shown in Fig. 1, when there is no load on the platform. When a capacity load is placed on the platform, the pendulum will rotate about the shaft 13, so that the pendulum weight 34 will swing to a position opposite from that shown. That is, the pivot 2 will swing on the axis of shaft 13 so as to move in a generally vertical arc with a minimum horizontal component for the particular arc, and consequently the horizontal movement of the lower end of the rack 1 minimized. As this movement is minimal in comparison with the length of the rack, the rack can for all practical purposes be considered vertical. Also, because the force exerted on the pendulum by the load is partly counteracted by the force exerted by the weighted lever device, the load and the friction on the pendulum shaft 13 are minimized.

The weight of the rack 1 acts in a vertical direction on the pivot 2 and can therefore be considered part of the pendulum's weight concentrated on the pivot. The pivot 2 is so located, that the plane connecting the axis of shaft 13 and the axis of pivot 2 is at a right angle with the plane connecting the axis of said shaft and the center of gravity of the pendulum modified by the weight of the rack concentrated on said pivot.

The pendulum is affected by the load at the ribbon 8, by the weighted lever device at the ribbon 5, by the resultant force of the weights of the pendulum and the rack, and by the reactive force on the pivot 2 from the pressure between the rack 1 and the pinion 72. Since it is almost negligible, the latter force can be considered horizontally directed and unvaried.

Fig. 3 illustrates diagrammatically the balancing condition of the weighing mechanism and the movement of the indicator. G is the described resultant force produced by the combined weights of the pendulum and the rack 1; P is the load acting at the ribbon 8 on the power cylinder 11 having a radius $r$; K is the force at the ribbon 5 caused by the weighted lever device; and Q is the force at the pivot 2 due to the rack 1 being held against the pinion 72.

These forces produce turning moments on the pendulum with respect to the pendulum shaft 13. In equilibrium, the sum of the turning moments acting clockwise is equal to the sum of the turning moments acting counter-clockwise.

When the load P acts on the pendulum, the mechanism is in equilibrium as shown with heavy, full lines. An increase $p$ to the load will move the pendulum and the indicator 65 to a new position of equilibrium, shown with dotted lines. The increase in turning moment represented by $p \times r$ is equal to the decrease represented by the sum of $G \times h$ and $Q \times x$. As $h$ and $x$ are proportional, being sides in two similar triangles, the following formulas apply:

$$pr = Gh + Qx$$

$$\frac{h}{x} = k \quad \text{constant}$$

Therefore $$pr = (Gk + Q)x$$

This shows that the vertical movement of the rack 1, and therefore the movement of the indicator 65, is proportional to the increase to the load, and it follows that the graduations on the dial 66 are equidistantly spaced.

In the foregoing has been described a rack pivotally connected with the pendulum. Fig. 4 illustrates an alternative arrangement in which a vertical rack 20 having a recess 23 is adapted to move in a vertical direction between rollers 21, 21, pivotally mounted in the housing 67, and to engage with the pinion 72, the rack being actuated by the pendulums 3, 11, 34 by means of a roller 22 mounted on the pivot 2 and received in said recess 23.

Said rack 20 may be actuated by the pendulum directly by means of said pivot 2 without the use of said roller 22.

Having described my invention, I claim:

1. In a pendulum weighing scale, a dial, an indicator movable thereover, means for moving the indicator during weighing operation including rotatably-mounted load-counterbalancing pendulum means comprising a pendulum swinging on a fixed axis, a power cylinder concentric with said axis, and a counterweight, said power cylinder ribbon-connected to a load, a lateral pivot fixed to said pendulum means, a substantially vertical rack carried by said pivot, and which has teeth on one side thereof, a pinion associated with said rack for operating said indicator, and a weight on said side of said rack for urging said teeth into engagement with said pinion.

2. A pendulum weighing scale as in claim 1, in which said rack is rotatably mounted on said pivot, the axis of said pivot being parallel to said fixed axis, and the axis of said pivot and said fixed axis being located in a plane which intersects at right angles a plane in which are located said fixed axis and the center of gravity of the pendulum modified by the weight of said rack concentrated on said pivot, said fixed axis being at the intersection of said planes.

3. A pendulum weighing scale as in claim 1, wherein a weighted lever is ribbon-connected to the power cylinder and affects the pendulum conversely to the load in order to enable said pendulum to counterbalance the load on either side of the vertical through the pendulum fulcrum.

4. In a pendulum weighing scale, a dial, an indicator movable thereover, and means for moving the indicator during weighing operation including a single rotatably-mounted load-counterbalancing pendulum swinging on an axis, a lateral pivot fixed to said pendulum, a vertical rack carried by said pivot, said rack having a recess engaged by said pivot in such fashion that said pivot and recess form a pivot-connection between said rack and said pendulum, guide-roller-means by which said rack is guided, said rack having teeth on one side thereof, a pinion associated with said rack for operating said indicator, and a weight on said side of said rack for urging said teeth into engagement with said pinion.

5. A pendulum weighing scale as in claim 4, in which the plane connecting said axis and the axis of said pivot is at a right angle with the plane connecting said axis and the center of gravity of the pendulum modified by the weight of said rack concentrated on said pivot.

6. A pendulum weighing scale as in claim 4, wherein said pivot is provided with a roller as an intermediary between said pivot and said rack.

References Cited in the file of this patent

UNITED STATES PATENTS

| | | |
|---|---|---|
| 1,205,691 | Wetzel | Nov. 21, 1916 |
| 1,872,420 | Iongh | Aug. 16, 1932 |
| 2,030,457 | Lewis | Feb. 11, 1936 |
| 2,533,862 | Williams | Dec. 12, 1950 |
| 2,540,386 | Body | Feb. 6, 1951 |
| 2,618,476 | Schroeder | Nov. 18, 1952 |